(No Model.) 2 Sheets—Sheet 2.

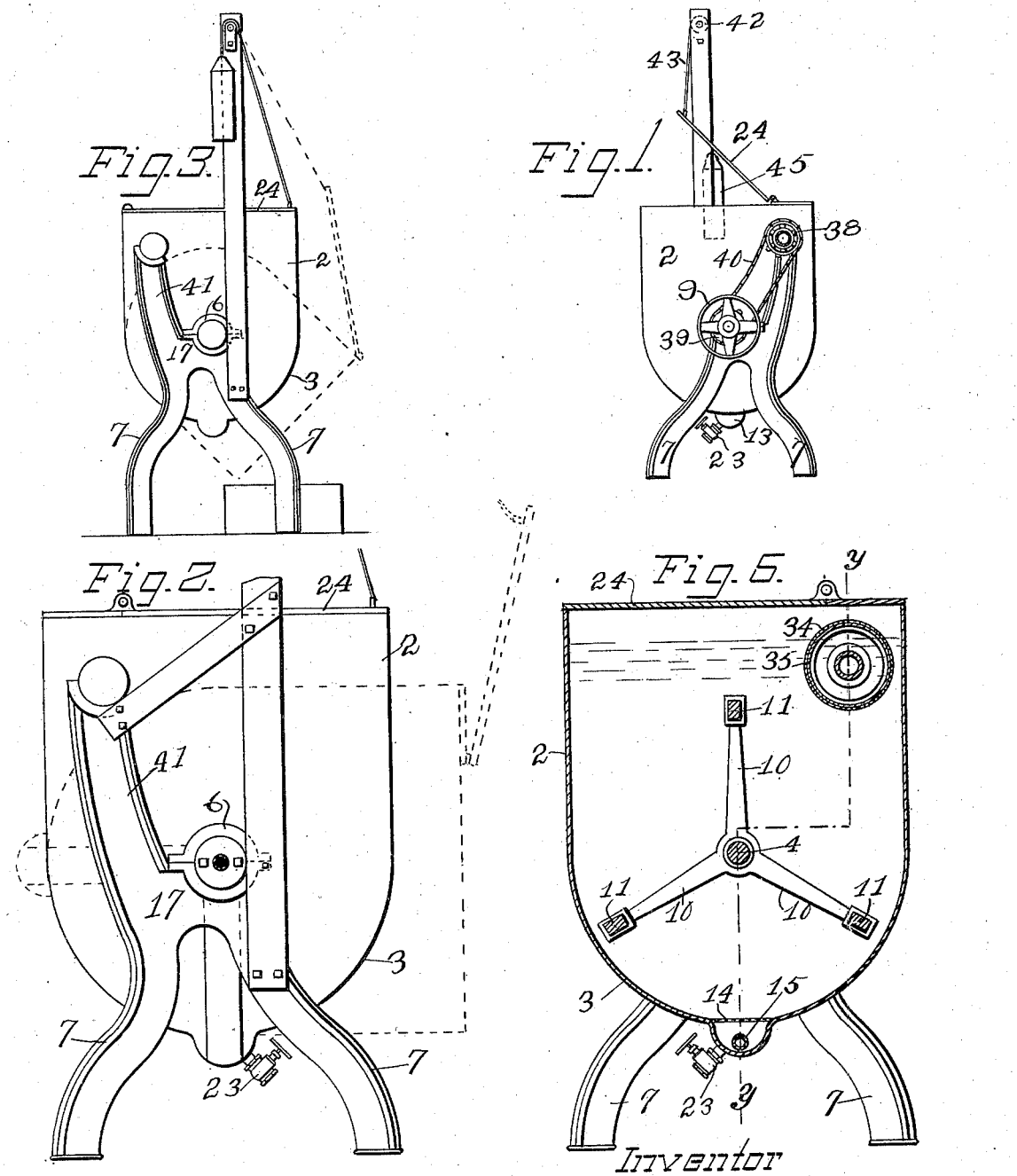

S. T. WIEDENBECK, A. L. NEUBERT & M. J. SIETZ.
MACHINE FOR WASHING FILTER MATERIAL.

No. 576,389. Patented Feb. 2, 1897.

Witnesses
B. P. Shepherd.
Richard Paul.

Inventors
Siegmund T. Wiedenbeck
Armin L. Neubert
Micheal J Sietz
By Paul O Harvey
their attorneys

THE NORRIS PETERS CO., PHOTO-LITHO., WASHINGTON, D. C.

UNITED STATES PATENT OFFICE.

SIEGMUND T. WIEDENBECK, ARMIN L. NEUBERT, AND MICHEAL J. SIETZ, OF MINNEAPOLIS, MINNESOTA.

MACHINE FOR WASHING FILTER MATERIAL.

SPECIFICATION forming part of Letters Patent No. 576,389, dated February 2, 1897.

Application filed March 25, 1896. Serial No. 584,741. (No model.)

*To all whom it may concern:*

Be it known that we, SIEGMUND T. WIEDENBECK, ARMIN L. NEUBERT, and MICHEAL J. SIETZ, of Minneapolis, Hennepin county, Minnesota, have invented certain new and useful Improvements in Machines for Washing Filter Material, of which the following is a specification.

Our invention relates to means for washing and steaming the material employed in beer-filters, to the end that the material may be used and reused. This is desirable, as the filtering material, commonly the finest quality of wood-pulp, is quite expensive, and it is as good as new if thoroughly washed after a period of use.

It is the object of our invention to provide a machine for washing filter material, which machine will require a minimum amount of attention; further, a machine which will wash the fine fiber perfectly and handle the same in such a way that the fibers will be kept distinct and none of the same wasted.

A further object is to provide a machine which will accomplish the work required of it quickly, which may be emptied with ease and in a short time, and, further, a machine which will be clean, being entirely self-contained instead of slopping and spilling water and pulp upon the floor, as do all prior machines employed for the same purpose.

Our invention consists in a vat or tank provided with a horizontal and longitudinal shaft, stirrers provided thereon, steam and water inlets in the bottom of the tank, and a suitable screened overflow pipe or shaft provided in the upper part of the tank or vat.

Further, our invention comprises a rotating screen having a perforated hollow shaft extending through the wall of the tank and serving as an overflow or outlet.

Further, our invention consists in an arrangement of the tank whereby the same may be dumped or canted, and, further, in particular constructions and combinations of parts, all as hereinafter described, and particularly pointed out in the claims.

The invention will be more readily understood by reference to the accompanying drawings, in which—

Figure 4:
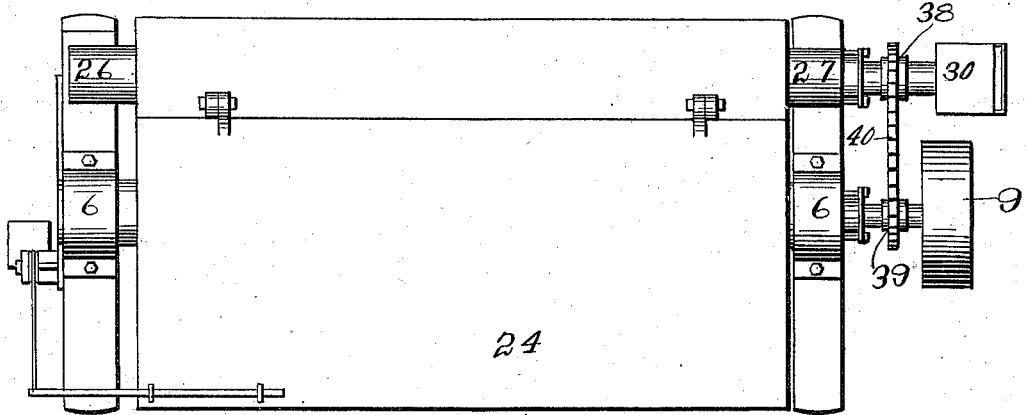
Figure 7:
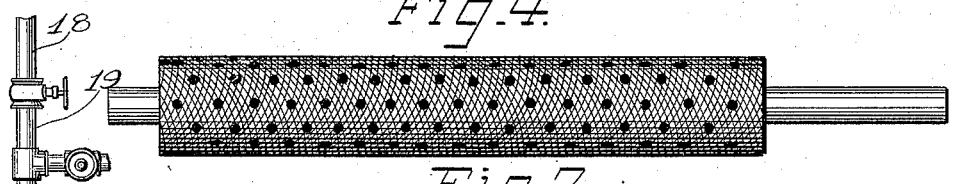
Figure 6:
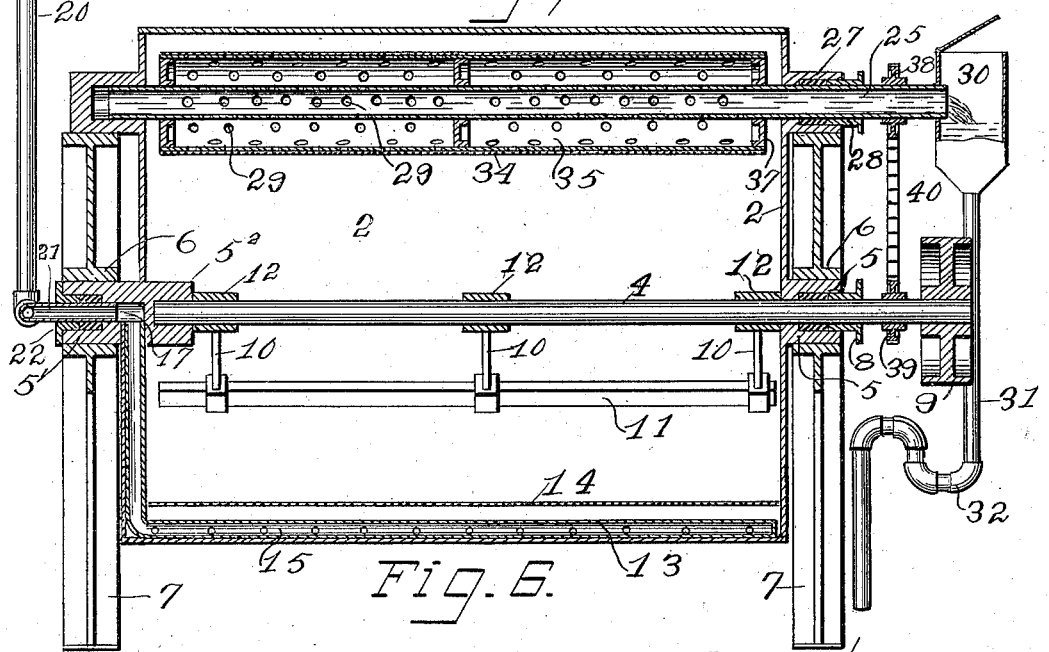

Figure 1 is an end view of a washer and steamer embodying our invention. Fig. 2 is a view of the opposite end thereof. Fig. 3 is a view, reduced in size, of the same end of the machine, but showing the vat or tank arranged at a greater height, so that it may be completely inverted. Fig. 4 is a plan view of the machine. Fig. 5 is a transverse vertical section. Fig. 6 is a longitudinal vertical section on the line $y\ y$ of Fig. 5. Fig. 7 is a side view of the rotary sieve employed in the upper part of the tank or vat.

As shown in the drawings, our washer and steamer comprises a vat or tank 2 of a convenient height and length and having a semi-cylindrical bottom 3.

4 represents a shaft extending longitudinally through the tank. The ends of the tank are preferably composed of castings and are provided with studs or trunnions 5, having bearings 6 in the end frames or legs 7, which support the tank. The shaft 4 has bearings in the studs or trunnions 5 5' and passing through the stuffing-box 8. Any one of them is provided upon its outer end with a driving-pulley 9. The boss or stud 5' at the opposite end of the machine preferably projects inward into the vat, (see $5^2$,) and in this the bearing is provided for the end of the shaft 4. The shaft 4 is provided with any convenient number of arms 10, which carry longitudinal slats or bars 11. These rotate quite close to the walls of the vat, particularly at the bottom thereof. The hubs 12 of the spiders form collars engaging the ends of the tank to prevent longitudinal movement of the shaft. In the bottom of the tank is a longitudinal trough 13, extending the full length thereof. Across the top of the trough I arrange a fine screen or sieve 14. Within the trough is a perforated pipe 15, through which water and steam are injected or supplied to the tank. A duct or pipe 17 leads from the center of the stud 5' to the perforated pipe 15.

18 and 19 represent steam and water pipes, each provided with a valve and continued in the pipe 20 to a swivel connection 21 at the end of the stud 5'. The swivel is made water-tight by a gland 22. One or more valves 23 are provided in the bottom of the trough 13 for quickly drawing off the water after a washing is completed. The top of the vat is closed by a cover or lid 24. At the top of the vat and at one side thereof is a rotary sieve or screen comprising a large cylindrical screen and a small hollow shaft 25, having bearings 26 and 27 in the ends of the vat.

26 is a closed bearing, while the hollow shaft 25 extends through the bearing 27, which is rendered tight by a packing and gland 28. Within the machine this hollow pipe or shaft 25 is perforated, the openings 29 being frequent therein, and the water overflows through this pipe and is discharged at the end thereof into a suitable head 30, from which a pipe 31 leads through a trap 32 to a suitable drain. This trap is made up of elbows, and the joints between some are loose in order that the trap may be turned slightly to permit the withdrawal of the head 30 from the end of the pipe 25 when the tank is to be tilted. It is obvious that if the pipe 25 were alone used a great deal of the fine wood-pulp would pass out through the openings thereof, and it is necessary to provide a large-surfaced screen around the overflow-pipe. This screen 34 is in the form of a cylinder surrounding the pipe 25 and supported by disks 37, arranged thereon. The screen is additionally supported by a perforated sheet-iron lining 35, having perforations 36 of even greater number than indicated in Figs. 6 and 7. In order to keep the screen clear, it is necessary to rotate it, and for this purpose we provide sprocket-wheels 38 and and 39 upon the shafts 25 and 4, respectively, arranging thereon a sprocket-belt 40, whereby the hollow shaft and the screen carried thereby are rotated, preferably at a greater speed than the shaft 4, though this is not essential. The tank or vat may be tilted upon the trunnions 5 5', being thrown into either of the positions shown by dotted lines in Figs. 2 and 3. In its upright position it is held by the engagement of the bearings or boxes 36 and 37 with extensions 41 of the frame 7.

We prefer in making the machine to provide it with a tall frame 7, as shown in Fig. 3, in order that the tank may be entirely inverted to empty the tank of material after the water is drained off.

42 represents a pulley, suitably supported, over which passes a cord 43. One end of this is attached to the lid or cover 24, while the other end carries a weight 45. By this means the cover is raised automatically when the vat is tilted, and the weight aids in lifting the heavy cover at other times.

The operation of our machine is as follows: The filtering material when it is taken from the filter and brought to our machine is quite packed. It is dumped into the vat, after which the steam and water are turned into the vat, and these are allowed to run constantly, so that the water soon rises to the top of the vat and overflows through the hollow shaft 25. The stirrers or beaters 11 are then started and act to keep the thin mass of wood-pulp in constant agitation, so that the water and steam may best carry off the impurities. As the beaters 11 rotate they pass transversely through the streams of water emitted by the perforated pipe, and the streams and currents of water are so thoroughly broken and distributed that the mixture of water and fiber is at all times perfect. The stirrers rotate toward the rotating sieve or screen, and are used not only during the washing process, but are also allowed to run after the vat is tilted for the purpose of thrusting the pulp from which the water has been drained toward the edge of the vat.

The machine is perfectly clean, as there is no leakage of water or steam from the machine, all of the water except at the final draining passing off through the small hollow shaft 15 and thence into a direct sewer connection.

Having thus described our invention, we claim as new and desire to secure by Letters Patent—

1. In a machine for washing filter material, the combination, with a tank or vat, of a frame wherein the same is trunnioned and is adapted to be tilted to empty the tank of its contents, a shaft extending into the tank or vat through the trunnions thereof, stirring-arms provided thereon, a water-inlet pipe through one trunnion, and means for driving the stirrer-shaft, substantially as described.

2. In a machine for washing filter material, the combination, with a tank or vat, of a trough provided in the bottom of said tank, a water-inlet pipe provided therein, a screen provided across the top of said trough, a revoluble screen provided in the upper part of the tank, the shaft supporting said screen, said shaft being hollow and perforated and extending through the end of the tank as an overflow-pipe, a trap or head into which the hollow shaft discharges, and means for driving said hollow or screen shaft, substantially as described.

3. In a machine for washing filter material, the combination, with a tank or vat, of a frame wherein the same is trunnioned and adapted to fit, a longitudinal shaft having bearings in the trunnions of the tank, stirring-arms or slats provided upon said shaft, the water-supply pipe, one of the trunnions of the tank being hollow, said water-pipe having a swivel connection therewith, and a connection leading from the trunnion into the tank for the supply of water to the lower part thereof, substantially as described.

4. In a machine for washing filter material, the combination, with a tank or vat, of a frame wherein the same is trunnioned and adapted to tilt, a cover or lid for the tank, a cord attached thereto and provided with the counterbalance-weight, said cord passing over a pulley, substantially as described.

In testimony whereof we have hereunto set our hands this 16th day of March, A. D. 1896.

SIEGMUND T. WIEDENBECK.
ARMIN L. NEUBERT.
MICHEAL J. SIETZ.

In presence of—
C. G. HAWLEY,
M. E. GOOLEY.